US 8,404,155 B2

(12) United States Patent
Aradi et al.

(10) Patent No.: US 8,404,155 B2
(45) Date of Patent: Mar. 26, 2013

(54) NANOPARTICLE CATALYST COMPOUNDS AND/OR VOLATILE ORGANOMETALLIC COMPOUNDS AND METHOD OF USING THE SAME FOR BIOMASS GASIFICATION

(75) Inventors: Allen Aradi, Glen Allen, VA (US); Joseph Roos, Mechanicsville, VA (US); Tze-Chi Jao, Glen Allen, VA (US)

(73) Assignee: Afton Chemical Corporation, Richmond, VA (US)

( * ) Notice: Subject to any disclaimer, the term of this patent is extended or adjusted under 35 U.S.C. 154(b) by 63 days.

(21) Appl. No.: 12/685,791

(22) Filed: Jan. 12, 2010

(65) Prior Publication Data
US 2010/0299990 A1 Dec. 2, 2010

Related U.S. Application Data

(63) Continuation-in-part of application No. 12/475,664, filed on Jun. 1, 2009, now Pat. No. 8,241,599.

(51) Int. Cl.
*C01B 3/28* (2006.01)
*C01B 3/24* (2006.01)

(52) U.S. Cl. ..................... 252/373; 423/650

(58) Field of Classification Search ............ 252/373
See application file for complete search history.

(56) References Cited

U.S. PATENT DOCUMENTS 6,531,704 B2  3/2003  Yadav et al.
7,967,876 B2 *  6/2011  Aradi et al. ............. 44/363
2006/0175230 A1 *  8/2006  Zhou et al. ............. 208/113
2007/0180760 A1 *  8/2007  Zhou et al. ............. 44/354
2008/0040969 A1 *  2/2008  Aradi et al. ............. 44/603
2008/0206562 A1 *  8/2008  Stucky et al. ............. 428/403
2009/0071067 A1 *  3/2009  MacPherson et al. ........ 44/601

OTHER PUBLICATIONS

Guaiacyl and Syringyl Lignin Composition in Hardwood Cell Components; John R. Obst; Holzforschunh 36 (1982); pp. 143-152.
Synthesis and reduction behavior of sol-precipitated iron oxide/tungsten oxide nanoparticles; Jong-Jin Pak; M. Bahgat, Min-Kyu Peek; Journel of Alloys and Compounds 479 (2009) pp. 631-618.
U.S. Appl. No. 12/475,664, filed Jun. 1, 2009.

* cited by examiner

*Primary Examiner* — Melvin C Mayes
*Assistant Examiner* — Kenneth Vaden
(74) *Attorney, Agent, or Firm* — Thomas & Karceski, P.C.

(57) ABSTRACT

A nanocatalyst, dual catalyst and methods for improving the efficiency and output of a biomass gasification process are provided where the catalysts comprise a volatile organometallic compound(s) and/or a nanoalloy catalyst. By the catalyst and method, a very high biomass gasification conversion efficiency of over 85% can be achieved. The subject nanocatalyst cracks and gasifies lignin, which is generally inert in conventional gasification, at relatively low gasification temperatures. The subject disclosure also provides a means to increase gas yields and lower lignin content in the resulting product relative to conventional gasification. Alternatively, oil production may be increased, if desired. Moreover, the resulting gas may achieve a Fischer-Tropsch reactor favorable $H_2$:CO ratio of about 9:1. The energy input to the gasification is correspondingly reduced to reduce costs and the environmental impact associated with the gasification process.

17 Claims, 2 Drawing Sheets

Biomass gasification product yields

| Catalyst | Temp. (°C) | Oil yield (%) | Char Yield (%) | Gas yield (%) |
|---|---|---|---|---|
| Baseline | 450 | 43.70 | 14.90 | 41.50 |
| 1. mmt® at 1.0% | 400 | 32.00 | 11.57 | 56.48 |
| 2. mmt® at 4.0% | 400 | 25.50 | 11.09 | 63.41 |
| 3. mmt® at 4.0% / nanoalloy* at 4% | 400 | 40.95 | 35.52 | 23.53 |
| 4. mmt® at 4.0% / nanoalloy** at 4% | 400 | 64.26 | 22.20 | 13.54 |
| 5. mmt® at 1.0% / *** (w) at 4% | 425 | 21.88 | 11.00 | 67.12 |
| 6. mmt® at 1.0% | 600 | 25.00 | 13.10 | 61.70 |
| 7. mmt® at 1.0% / *** (w) at 4% | 600 | 4.39 | 10.50 | 85.11 |

\*     $Ni_3Cu(SiO_2)_6$ nanoalloy powder
\*\*    $Si_{50}Ni_{35}Cu_{10}Ce_5$ nanoalloy powder
\*\*\*   $Ni_3Cu(SiO_2)_6$ nanoalloy /DEG dispersed in ethanol, with DEG/Ethanol ratio of 1/2

The indicated gas yields were GC analyzed to give compositions in Figure 2

Figure 1: Biomass gasification product yields

| Catalyst | Temp. (°C) | Oil yield (%) | Char Yield (%) | Gas yield (%) |
|---|---|---|---|---|
| Baseline | 450 | 43.70 | 14.90 | 41.50 |
| 1. mmt® at 1.0% | 400 | 32.00 | 11.57 | 56.48 |
| 2. mmt® at 4.0% | 400 | 25.50 | 11.09 | 63.41 |
| 3. mmt® at 4.0% / nanoalloy* at 4% | 400 | 40.95 | 35.52 | 23.53 |
| 4. mmt® at 4.0% / nanoalloy** at 4% | 400 | 64.26 | 22.20 | 13.54 |
| 5. mmt® at 1.0% / ***(w) at 4% | 425 | 21.88 | 11.00 | 67.12 |
| 6. mmt® at 1.0% | 600 | 25.00 | 13.10 | 61.70 |
| 7. mmt® at 1.0% / ***(w) at 4% | 600 | 4.39 | 10.50 | 85.11 |

\*       $Ni_3Cu(SiO_2)_6$ nanoalloy powder

\*\*     $Si_{50}Ni_{35}Cu_{10}Ce_5$ nanoalloy powder

\*\*\*   $Ni_3Cu(SiO_2)_6$ nanoalloy/DEG dispersed in ethanol, with DEG/Ethanol ratio of 1/2

The indicated gas yields were GC analyzed to give compositions in Figure 2

Figure 2: Biomass gasification gas yields compositions

Gas Analyses Where Nanocatalyst Selective for Gasification

| Catalyst | Temp. (°C) | CO, % | CO$_2$, % | CH$_4$, % | H$_2$, % |
|---|---|---|---|---|---|
| mmt® at 1.0% | 400 | 20.10 | 37.10 | 1.70 | 7.00 |
| mmt® at 1.0% | 600 | 20.00 | 24.50 | 2.60 | 8.60 |
| mmt® at 1.0% | 800 | 36.20 | 24.50 | 5.70 | 0.70 |
| mmt® at 1.0% / ***(w) at 4% | 425 | 20.30 | 45.50 | 6.40 | 15.80 |
| mmt® at 1.0% / ***(w) at 4% | 600 | 28.90 | 27.40 | 10.30 | 17.60 |

The balance is other hydrocarbons

*** Ni$_3$Cu(SiO$_2$)$_6$ nanoalloy /DEG dispersed in ethanol, with DEG/Ethanol ratio of 1/2

NANOPARTICLE CATALYST COMPOUNDS AND/OR VOLATILE ORGANOMETALLIC COMPOUNDS AND METHOD OF USING THE SAME FOR BIOMASS GASIFICATION

CROSS-REFERENCE TO RELATED APPLICATIONS

This application is a continuation-in-part of, and claims priority to, U.S. patent application Ser. No. 12/475,664, filed Jun. 1, 2009, "now U.S. Pat. No. 8,241,599," the contents of which are hereby incorporated by reference in their entirety.

FIELD OF THE DISCLOSURE

The present invention relates to use of a nanoalloy catalyst, a dual catalyst and/or method of using the same for improving the efficiency and output of a biomass gasification process. The term "gasification" here includes slow or fast pyrolysis/gasification in the absence or presence of oxygen and/or in the absence or presence of steam, whereby the pyrolysis/gasification process is carried out sequentially, or simultaneously. By the present disclosure, a nanoparticle/nanoalloy catalyst or a nanoparticle/nanoalloy catalyst with a volatile organometallic compound(s) is used to catalyze biomass gasification to achieve a very high biomass gasification conversion efficiency of up to or over 85% gas product. The volatile organometallic catalyst is driven into the vapour phase together with biomass components being volatilized during the pyrolysis phase, and very little of the catalyst remains on the char solids. Therefore, this particular nature of catalyst gasifies volatile hydrocarbons, sugars, carbohydrates, and cellulose but does not crack the lignin component of biomass, which is non-volatile. The nanoalloy catalyst treatment increases gas yields and, in one embodiment, cracks and gasifies lignin, which is generally inert in conventional gasification. The nanoalloy catalyst achieves the increased conversion efficiency and cracking of any biomass lignin at relatively low biomass gasification temperatures. As such, the dual/combination catalyst and subject methods disclosed herein provide a means to increase gas yields while lowering the lignin content in the resulting product relative to the gas yields and lignin content from conventional gasification. Moreover, the resulting gas achieves a Fischer-Tropsch reactor favourable $H_2$:CO ratio of about 9:1. In one embodiment, it is also possible to switch the mechanism away from gas yield to substantially increase the liquid product yield, if desired.

BACKGROUND

Gasification is a process for converting carbonaceous materials into carbon monoxide and hydrogen by reacting the raw material at high temperatures with a limited but measured amount of oxygen and/or steam. The idea is to extract energy from different types of organic materials. If the biomass is naturally sufficiently oxygenated, then no oxygen and/or steam need be utilized in the gasification.

Biomass is an abundant and renewable resource, and the gasification process produces fuels and compositions that can be used in many industries. For instance, the resulting mixture of carbon monoxide and hydrogen gas that results from biomass gasification is known as synthesis gas or syngas. The syngas product can be a more efficient combustion source than the original biomass material. The syngas can be used as a synthetic fuel for the transportation, electrical production, or other industries. As another example, the chemical industry could employ gasification products such as olefins (e.g., propylene, ethylene, and the like) and aldehydes, such as formaldehyde, for polymeric materials.

While syngas can be used directly for energy production, syngas can also be used, via additional processing, to produce methanol and hydrogen or otherwise be converted via the Fischer-Tropsch process into a synthetic fuel, such as synthetic syndiesel. Alternatively, the Fischer-Tropsch process may be configured to produce a "syncrude" to be used as a refinery feed in the same manner as fossil crude oil. Gasification can also begin with materials that are not otherwise useful as fuels. For example, bio-/organic waste can be used as the feed material.

The amount of energy introduced to the gasification process is a major expense that subtracts from the net power production from the syngas. There is also an environmental impact to producing the required energy for gasification. Biomass gasification with optimization of syngas yield is an ongoing challenge that, if overcome, could enable efficient conversion of biomass carbon to syngas. Biomass gasification and combustion, overall, is a renewable energy that is potentially $CO_2$— neutral. That is, biomass cultivation can remove the same amount of $CO_2$ from the atmosphere as is emitted from gasification and combustion.

There is a need for improvements to the chemical biomass gasification process. Ideally, such improvements would improve bio-oil or gas yield (whichever is the desired end product) and reduce lignin content in the resulting product, and otherwise produce an improved gasification process for biomass. As much hydrogen should be stripped off the biomass to give $H_2$, and as much carbon converted to CO, as possible. With an $H_2$:CO mole ratio of 2:1 or greater, the syngas can comprise a feed stream into a Fischer-Tropsch reactor system for conversion to syncrudes that are either predominantly hydrocarbon or mixed alcohols based. Again, an advantage of fuels derived from biomass gasification is that they are carbon neutral and, therefore, are not a net contributor of $CO_2$, a possible green house gas.

SUMMARY OF THE DISCLOSURE

The nanoalloy catalyst, optionally with a volatile organometallic compound as a dual catalyst, and methods of using the same of the present disclosure provide for improved gasification of biomass including higher gas yields, reduced solid yields (including reduced tar and lignin), and reduced liquid yields. In one embodiment, however, the nanoalloy catalyst is provided alone or in combination with the volatile organometallic compound to surprisingly increase liquid yields.

In another embodiment, a composition comprises a nanoalloy catalyst and volatile organometallic compound alone. As also disclosed herein, there is provided a composition comprising a biomass and a nanoalloy catalyst, also referred to herein as "nanocatalyst". The nanocatalyst is, in one embodiment, contacted with the biomass as a nanoalloy powder. In another embodiment, the nanocatalyst is an alcohol-dispersible nanoalloy. The nanocatalyst may comprise the formula $S[M_x]_y$, where 'S' is a support material and 'M' represents one or more metal-containing compounds. 'x' and 'y' are positive integers.

The support material may comprise, but is not limited to, silica, alumina, titania, nanocarbon, grapheme, activated carbon, thoria, zirconia, zeolites, mixtures thereof, and the like. The catalyst metals of the nanoalloy may independently be, but are not limited to, Fe, Co, Ni, Mo, W, Th, Ru, Pt, Rh, Mn, Cr, Ga, La, Ce, Re, Pd, Ti, Cu, or K. In at least one embodiment, the support material of the nanoalloy is about 50 wt % of the nanocatalyst.

In another embodiment, the nanoalloy catalyst may be represented by the formula SAxByCz where 'S' is a support as disclosed above and 'A' is a metal-containing compound. 'B' represents a promoter, which may comprise one or more metals. 'C' is an activator, such as Pt, Pd, Rh, Ru, Os, Ir, Zr, La, Ce, Li, K, and Na. 'A' could be 25 to 80 wt %, 'B' could be 15 to 25 wt %, and 'C' could be 0.001 to 1 wt %. The nanoalloy might comprise multiple metal-containing compounds (e.g., $S(A_1)(A_2)\ldots ByCz$) as might the promoter and activator. However, it is thought the overall wt % ratio fall within the range of 25 to 80 wt % for metal-containing compounds, 15 to 25 wt % for any promoter and 0.001 to 1 wt % for any activator.

One method of gasifying a biomass comprises contacting a volatile organometallic compound with the biomass. In this embodiment, a second nanocatalyst as a dual catalyst is contacted with the biomass either before, with, or after the volatile organometallic compound. One or both steps of contacting the biomass with a catalyst from the dual catalyst can be optionally followed by the step of stripping a solvent(s) off the biomass under vacuum and/or warming conditions. The steps of contacting the biomass with the volatile organometallic and nanocatalyst can occur before and/or during the gasification of the biomass.

Biomass includes lignin structure. For example, plant-based biomass comprises about 15-25 wt % lignin, 23-32 wt % hemicelluloses, and 38-50% cellulose. The lignin matrix is the most difficult component to gasify. While a volatile organometallic compound for use in the dual catalyst cleaves the methoxy substituents of the lignin (see, U.S. patent application Ser. No. 12/475,664", now U.S. Pat. No. 8,241,599"), the lignin matrix in the biomass remains largely in tact. The remaining lignin comprises part of the char and part of the oil/liquid product following gasification.

In one embodiment, the dual catalyst as disclosed herein cracks the normally inert/non-reactive lignin matrix and gasifies it during the gasification process. By 'cracks', 'cracking', or 'cracked', it is meant herein that a lignin component is broken into smaller molecular weight components. Lignin is a relatively high molecular weight polymer. Cracking the lignin promotes, allows for, and/or facilitates gasification (e.g., increased bio-oil or syngas production at lower gasification temperatures).

The use of the dual catalyst in one gasification process herein achieves a conversion efficiency of biomass to gas of at least about 80% and in another embodiment at least about 85% by weight at 600° C. As the inert lignin structure is cracked by the dual catalyst, lignin levels can be reduced to less than 5% by weight of the gasification product. Moreover, the resulting syngas has a $H_2$:CO mole ratio greater than 2:1 and the mole ratio may be 9:1 at 600° C.

If the nanocatalyst is a nanoalloy powder (i.e., not dispersed or suspended in an alcohol or other polar solvent), then product selectivity from the biomass gasification with a volatile organometallic compound significantly shifts from gases to bio-oils. Yet, unexpectedly, the nanoparticle-based catalyst prepared with a support, such as silica, as a dispersion in a polar solvent, such as but not limited to water, alcohols, including ethanol, and mixtures thereof, using a dispersant switched the product selectively back to gases with the very high conversion efficiency of at least about 80% or in another embodiment at least about 85% at just 600° C. (following contacting the biomass with the volatile organometallic). Lignin levels were reduced from an average of about 25% by weight for the volatile organometallic alone to 4.39% by weight following the contacting of the biomass with the dual catalysts and gasification of a biomass at 600° C. In one gasification procedure, the volatile organometallic was present at 0.25 wt % to 8 wt % of the biomass. In one embodiment, the volatile organometallic was present at 1 wt % of the biomass. The nanoalloy can be present alone or with the volatile organometallic compound at 0.25 wt % to 5 wt % of the biomass. In one embodiment, the nanoalloy portion of the dual catalyst is present at 4 wt % as a wt percentage of the biomass. The nanocatalyst can be dispersed in ethanol using ethylene glycol. However, other dispersants, surfactants, alcohols, or polar solvents would be suitable.

An organometallic compound(s) of the subject dual catalyst and methods is oil-soluble or dispersed or mixed in a lubricant, carrier fluid, or fuel. The compound could be in liquid or solid states. The subject organometallic compounds can be contacted with the biomass before and/or during the gasification process. The organometallic compound can in one embodiment volatilize and thereby be injected into the gasification reactor or product (e.g., syngas) stream leaving the reactor. In one embodiment, the biomass is treated with a dilute solution of the volatile organometallic in a low boiling solvent. The solvent is then optionally stripped from the biomass under appropriate conditions before or after contacting the biomass with the nanocatalyst.

By "organometallic compounds" herein is meant any molecules containing a carbon-metal moiety. These compounds may be "volatile" in that they can sublime or vaporize from ambient conditions up to about 450° C. Therefore, volatile organometallics could be, for example and without limitation, cyclomatic manganese carbonyl compounds such as methyl cyclopentadienyl manganese tricarbonyl, cyclopentadienyl manganese tricarbonyl, manganese carbonyl materials; ferrocene and iron carbonyl materials; cerium-containing compounds; platinum group metal compounds; and the like or mixtures thereof.

By "biomass" herein is meant wild, anthropogenically cultivated, genetically engineered, and/or bioengineered trees, bushes, grasses, algae, plankton, aquatic plants, yard trimmings and waste, wood chips, saw dust, mariculture products, animal parts and carcasses, animal waste, farm waste, agricultural waste, fodder, silage, organic waste and/or by-products and mixtures thereof alone or in combination with emulsions, suspensions, and dispersions thereof in water, alcohol, or other carrier fluids. 'Biomass' is broadly intended to mean woods, grasses, aquatic life, and/or animals or animal by-products/waste. In yet a further embodiment, "biomass" comprises coal, coal dust, and the like. In at least one embodiment, biomass is a renewable fuel source.

By "contacting" herein is meant the contacting, bringing together, reacting, complexing, coordinating, combining, admixing, mixing, and the like association between two or more materials, whether or not a chemical or physical reaction or change occurs.

For clarity, it should be understood that a 'nanoalloy' is different than a mixture or doped composition. In a mixture, the different elements in the mixture retain their chemical and physical characteristics, and their composite spectrum (i.e., XRD) is simply a superimposition of the spectra of the component elements in the mixture. A doped composition comprises small quantities of one element that are added to the bulk of another element with the intention of modifying the electronic properties of the bulk element through alteration o the crystal lattice of that element. To achieve the desired goal in electronics, the dopant is not homogeneously dispersed in the bulk material, but rather, interspersed in discrete islands in the bulk of the primary (major) element. The XRD spectrum resembles that of mixtures.

Nanoalloys comprise component elements that are homogeneously dispersed in each other to give a material similar to a liquid solution. A crystal lattice is formed to make up the Nanoparticle. The spectrum (i.e. XRD) shows bands different from those one would observe by simply mixing the component elements together or doping one element with another, as described above. Therefore, a nanoalloy is basically a new composition of matter on the atomic scale. In other words, it is a hybrid product of the constituent elements and its reactivity is modified by the resultant rehybridized highest occupied molecular orbital (HOMO) and lowest unoccupied molecular orbital (LUMO) orbitals responsible for its chemical reactivity-selectivity. See, for instance, the article *Synthesis and reduction behavior of sol-precipitated iron oxide/ tungsten oxide nanoparticles*, Journal of Alloys and Compounds 479 (2009) 613-618 (FIG. 2 illustrates a nanomixture while FIG. 6 represents a nanoalloy).

The production of the nanoalloy may occur via a known process, such as the methods for making metal-containing nanoparticles as disclosed in U.S. patent application Ser. No. 11/620,773", now U.S. PG Pub No. 2008/0164141", which is herein incorporated by reference in its entirety. Metal-containing nanoparticles or nanoalloy particles have very small grain sizes of less than 50 nanometers. For example, the nanoparticles may have size or uniform size ranging from about 1 to about 30 nanometers. Other uniform particles sizes may range from about 2 to about 10 nanometers.

The gasification temperature may be any conventional temperature for gasifying a biomass. In one preferred embodiment, the gasification is conducted at a temperature from 300° C. to 800° C. The increased yields achieved herein are achieved at the same or lower gasification temperatures than conventionally used. At or above 800° C. gasification is largely achieved due to the high energy input. One goal for biomass gasification in general has been to achieve higher gas conversion for biomass at temperatures much lower than 800° C.

In yet another embodiment of the disclosure, a method to produce syngas from biomass gasification where the syngas has a $H_2$:CO mole ratio of at least 2:1. In one embodiment, the ratio is about 9:1. The method comprises contacting a biomass with at least a nanoalloy catalyst or a nanoalloy catalyst and an organometallic compound as disclosed herein before or during gasification. The resulting gas with a $H_2$:CO mole ratio of at least 2:1 may be further processed. In addition, the high level of hydrogen produced can facilitate installation of a hydrogenation reactor in series and downstream of the pyrolysis/gasification system disclosed herein. The hydrogenation reactor would passivate the oil product against reactions that contribute to viscosity increase during storage. That is, at least a portion of the hydrogen from the gasification conducted in the pyrolysis/gasification system can be used in the hydrogenation reactor to stabilize the oil product. Externally sourced hydrogen could be reduced or eliminated. As also noted below, stabilized bio-oil produced by the subject gasification/pyrolysis can be a raw material feed stock for existing refineries (i.e., refineries originally built for petroleum crude oils).

As noted above, the catalysts and methods disclosed herein provide improved gasification yields at gasification process temperatures lower than previously attainable. As such, there is an overall reduction in energy input while providing the increased gas yields. The reduction in energy reduces the cost and environmental impact associated with the gasification process. Conventionally, higher gasification reaction temperatures are employed in order to achieve higher gas yields. However, increased energy input is very expensive and incurs a corresponding, negative environmental impact (i.e., more fuel consumed to produce higher input temperatures). The subject method surprisingly provides increased gas and/or oil yields at reduced reaction temperatures.

The present disclosure further relates to a method for controlling liquid yields. From the subject nanoalloy catalyst, dual catalyst and related methods, the resulting liquids, due to the production of methanol, are more stable than liquids/oils produced by biomass gasification without the addition of the subject organometallic compounds. It is also thought that the possible use of alkaline earth metals in the nanoalloy will provide a higher pH to the resulting oil. The higher pH maintains a low viscosity (i.e., renders the oil more stable) for later processing, if desired. As briefly noted above, the nanoalloy catalyst as a powder can increase oil yield whereas the nanoalloy catalyst dispersed in alcohol increases gas yields.

It is to be understood that both the foregoing general description and the following detailed description are exemplary and explanatory only and are intended to provide further explanation of the present invention, as claimed. The foregoing and additional features and advantages of the present invention will become apparent to those of skill in the art from the following detailed description of a preferred embodiment taken in conjunction with the accompanying drawings.

BRIEF DESCRIPTION OF THE FIGURES

FIG. 1 illustrates gasification product results for a baseline test, tests with one volatile organometallic compound, and tests for a volatile organometallic and a nanoalloy dual catalyst at various treat rates and temperature; and FIG. 2 illustrates the gas analyses in instances where selectivity to gases was achieved.

DETAILED DESCRIPTION OF THE DISCLOSURE

In further detail, the applied nanoalloy catalyst or dual catalyst and related methods provide improved biomass gasification. As noted above, the disclosure provides a means to increase gas or liquid yields, as desired, and reduce solid/char product. The term "gasification" here includes slow or fast pyrolysis/gasification, in the absence or presence of oxygen, and/or in the absence or presence of steam, whereby the pyrolysis/gasification process is carried out sequentially, or simultaneously. The improved liquid and/or gas yields occur at lower biomass gasification temperatures than conventionally used.

The dual catalyst comprises a volatile organometallic compound and a nanoalloy catalyst/nanocatalyst for improved gasification of biomass including higher gas yields, reduced solid yields, and reduced liquid yields. In one embodiment, it is also possible to use the nanoalloy catalyst and/or dual catalyst disclosed herein to produce higher oil yields where the oil is stable for additional processing.

A volatile organometallic catalyst alone demonstrates selectivity to gasification over bio-oil formation from gasification of sugars, carbohydrates, and celluloses, as documented by co-pending U.S. patent application Ser. No. 12/475,664, which is incorporated herein by reference. The volatile organometallic compounds useful in the present disclosure are very active on the carbohydrates in the biomass. In other words, the volatile organometallics very efficiently gasify carbohydrates (sugars, starches, and cellulose). The subject organometallic compounds interact with the organics in such a way as to reduce the formation of tars resulting from gasification.

The volatile organometallic compound for use in the dual catalyst also cleaves the methoxy substituents of the lignin. However, the lignin matrix in the biomass remains largely in tact. The dual catalyst as disclosed herein cracks the normally inert/non-reactive lignin matrix and liquefies or gasifies it during the gasification process. The use of the dual catalyst in a gasification process may achieve, in one embodiment, a conversion efficiency of biomass to gas of at least about 80% at 600° C. As the inert lignin structure is cracked by the dual catalyst, lignin levels can be reduced to less than 5%. Moreover, the resulting syngas has a $H_2$:CO mole ratio of greater than 2:1 at 600° C. may have a $H_2$:CO mole ratio of 9:1 at 600° C.

The second component of the dual catalyst is the nanocatalyst. The nanocatalyst may be a nanoalloy powder or dispersible nanoalloy. The nanoalloy is represented by the formula $S[M_x]_y$ where 'S' is a support material and 'NI' represents one or more metal-containing compounds.

One method of converting the biomass to oil and/or gas products comprises contacting the biomass with the nanocatalyst. In another method, the biomass can also be contacted with the volatile organometallic compound (nanocatalyst and volatile organometallic compound as a dual catalyst). The nanocatalyst of the dual catalyst is also contacted with the biomass before, during, or after the volatile organometallic compound. As disclosed below, the nanocatalyst in powder form can significantly raise the oil yield relative to the solid and gas yields. Where the nanocatalyst is dispersed by a solvent, surfactant, or combination of a solvent and surfactant, one or both steps of contacting the biomass with a catalyst from the dual catalyst can be followed by the step of stripping the solvent and/or surfactant used to disperse the catalysts off the biomass under vacuum and/or warming conditions.

In further detail, one method of the subject disclosure is a biomass pyrolysis/gasification process in a fluidized bed reactor using sand as the fluid and nitrogen as the fluidizer. The pyrolyis and gasification temperature conditions were 425 and 600° C., respectively. The dual catalyst comprised methylcyclopentadienyl manganese tricarbonyl as the volatile organometallic compound and an alcohol dispersible nanoalloy of the composition $S[M_x]_y$, and more specifically $S(M1)_a(M2)_b$ where the support was silica at about 50 wt % of the nanocatalyst, M1 was Ni and M2 was Cu. 'x', 'y', 'a' and 'b' are integers greater than zero.

The biomass was treated with a dilute solution of the volatile organometallic in a low boiling solvent, which was then stripped off under vacuum and warming conditions. The second dual catalyst component was simultaneously contacted with the biomass as a dilute dispersion or solution in ethanol (i.e., a low boiling point, polar solvent) using ethylene glycol as a dispersant. The solvent was also stripped off under appropriate conditions.

The dispersion of nanoalloy with a polar dispersant/surfactant is thought to be important for increasing gas yields from gasification as the biomass includes pores with polarity. The nanocatalyst is dispersed or dissolved in a polar solvent (water, alcohol, etc or mixtures thereof) so as to better distribute the nanocatalyst to the biomass surface. The polarity of the pores 'draws' the nanocatalyst into the pores via the polar solvent/dispersant mix. In some circumstances, it may be desirable to produce a high liquid/oil yield. It has surprisingly been found that one nanocatalyst as disclosed herein supplied as a powder (i.e., not dispersed) produces oil yields at just 400° C. of at least 60%.

The nanocatalyst or dual catalyst treated biomass is charged into the reactor in a conventional fashion. The biomass may be charged into the reactor after contacting the nanocatalyst or dual catalyst or before. In other words, one or both catalysts may be applied before the biomass is charged into the reactor, after the biomass is charged into the reactor, or one catalyst before and one catalyst after. As noted above, the organometallic compound can in one embodiment volatilize and thereby be injected into the gasification reactor or product (e.g., syngas) stream leaving the reactor (which might be after contacting the biomass with the nanocatalyst).

Surprisingly, the biomass treated in the manner(s) above has a very high gas selectively with gas conversion efficiency of at least about 80% at just 600° C. and it is possible to obtain gas conversion efficiency at least as high as 85%. The high gas yield is at least partly a result of the reduction in lignin levels (i.e., lignin was cracked and gasified) from an average of 25% without the nanoalloy to 4.39% in the above method. For the purposes of this example, the volatile organometallic was present at 1 wt % and the nanoalloy portion of the dual catalyst at 4 wt % although the catalyst/catalysts can be provided in a treat rate range, as noted above.

An organometallic compound(s) of the subject dual catalyst and methods can be oil-soluble or dispersed or mixed in a lubricant, carrier fluid, or fuel. The compound could be in liquid or solid states.

The gasification temperature may be any conventional temperature for gasifying a biomass. In one preferred embodiment, the gasification is conducted at a temperature from 300 degrees ° C. to 800 degrees ° C.

Turning to FIG. 1, there is illustrated therein the performance of one volatile organometallic compound as a biomass gasification catalyst. Namely, FIG. 1 discloses the "baseline" biomass gasification test with no catalyst included. The "baseline" results were observed at a gasification process conducted at 450° C. The resulting oil yield is 43.70%. The char (solid) yield is 14.90% with an observed gas yield of 41.50%.

In accordance with the presently disclosed method, a volatile organometallic compound was added to the biomass at a treat rate of 1% of the total biomass mass. For this example, the organometallic compound comprised methylcyclopentadienyl manganese tricarbonyl (as sold under the brand name HiTEC® 3000 Performance Additive). The gasification process was then conducted at 400° C. (down from 450° C. for the baseline). Oil yields fell from 43.7% at 450° C. with no organometallic compound(s) to 34.7% with the introduction of 1% organometallic compound by mass of the biomass at 400° C. Char/solid yields were reduced from 14.9% to 11.35% under respective conditions. Finally, gas yields rose from 41.5% to 53.94%. It is thought that an even more improved yield spread would be obtained if the testing between the gasification without the organometallics and the testing with the organometallic were conducted at the same temperature. Therefore, the minimum percent increase for this embodiment of the subject method is thought to be 29.98%.

The table of FIG. 1 also illustrates a biomass gasification process conducted with 4% methylcyclopentadienyl manganese tricarbonyl by weight. Relative to the "baseline" test (i.e., 450° C. and no organometallic compound(s)), oil yields fell from 43.7% to 25.50%. Char yields fell from 14.9% to 11.09%. Gas yields dramatically increased from the 41.5% baseline to 63.41%. The lower temperature input (400° C. for gasification with the organometallic compound compared to 450° C. for the baseline test without the organometallic compound) reduces costs and the environmental impact of producing the energy necessary to conduct the gasification process.

The organometallic compound was in a liquid state at ambient temperatures, although the organometallic could be a solid, dispersion, etc. The organometallic compound ideally contacts multiple points of the biomass during a pre-treatment of the biomass (i.e., before feeding the biomass into the reactor). The organometallic compound(s) might also be directly injected into the reactor during the reaction. In any event, the organometallic compound is volatile in that it sublimes or vaporizes above ambient conditions and below the temperature of the gasification reactor. After sublimation or vaporization, the organometallic compound can also enter the product (syngas) stream.

In test 3 of FIG. 1, the organometallic compound is contacted with the biomass as 4 wt % of the biomass. A nanoalloy powder, in this example $Ni_3Cu(SiO_2)_6$, was contacted with the biomass at 4 wt % as well. Gasification was conducted at 400° C. The nanocatalyst was not dispersed in a solvent. Surprisingly, oil yields rose, relative to the treatment of biomass with the organometallic alone, to 40.95%. Char/solids were 35.52% of the product while the gas yield was 23.53%.

In test 4, the organometallic compound is contacted with the biomass as 4 wt % of the biomass. A nanoalloy powder, $Si_{50}Ni_{35}Cu_{10}Ce_5$, was contacted with the biomass at 4 wt % as well. Gasification was again conducted at 400° C. The nanocatalyst was not dispersed in a solvent. In this embodiment, oil yields rose, relative to the treatment of biomass with the organometallic alone, to 64.25%. Char/solids were 22.20% of the product while the gas yield was 13.54%. This result, of the tests conducted, maximized bio-oil yield at the 400° C. gasification temperature. Stabilized bio-oil produced by the subject gasification/pyrolysis can be a raw material feed stock for existing refineries (i.e., refineries originally built for petroleum crude oils).

Increasing the process temperature would convert at least some oil production to gas. However, as demonstrated in the test below, the wetted and dispersed nanocatalyst in a polar solvent increases gas production. It is thought that increased surface area contact facilities the further cracking of the lignin component that, at least in part, results in the higher gas yields Turing to test 5, the nanoalloy catalyst is again supplied at 4 wt % of the biomass while the volatile organometallic reduced to a 1 wt % treat rate. Gasification was conducted at 425° C. In this instance, the nanoalloy, again $Ni_3Cu(SiO_2)_6$, is wetted (w). Specifically, the nanoalloy was in a diethylene glycol or DGE solvent dispersed in ethanol with a DGE:ethanol ratio of 1:2. Surprisingly, at this relatively low gasification temperature, oil yields dropped to 21.88% with solid yields of only 11%. Gas yields climbed dramatically to 67.12%. Again, it is thought providing the nanocatalyst in dispersion with a polar solvent facilitates the contact of the nanocatalyst within the biomass pores. Lignin is cracked so as to reduce oil yields and increase gas yields.

Tests 6 and 7 further illustrate the effectiveness of the dual catalyst disclosed herein. Test 6, which comprises the volatile organometallic at 1 wt % of biomass at 600° C., produces gasification product yields of 25% oil, 13.10% solids and 61.70% gas. Adding the nanoalloy, $Ni_3Cu(SiO_2)_6$, in a DGE solvent dispersed in ethanol with a DGE:ethanol ratio of 1:2 at 600° C., as demonstrated by test 7, provided surprising gas yields of over 85% while oil yields were less than 5% and solid/char yields were less than 11%.

The increased gas yield provided by at least one of the methods disclosed herein is mainly partitioned between the $H_2$ and CO components of syngas. Conventionally, $CO_2$ comes from the catalytic decarboxylation of carboxyl functional groups in the biomass. $CO_2$ can be optionally converted to the more desired CO product by a water gas shift reaction component. For the dual catalyst as disclosed herein, the $H_2$:CO mole ratio is 9:1, which is well above the 2:1 ratio necessary for the syngas to be used as a feed stream into a Fischer-Tropsch reactor for conversion to syncrudes. Also this high amount of hydrogen yield sets the stage for installation of a hydrogenation reactor downstream of the pyrolysis/gasification reactor disclosed herein, in instances where a stable bio-oil is the desired product. Use of in situ generated hydrogen to hydrogenate the bio-oil and give a storage stable product is a highly sought out feature in bio oils made from biomass.

FIG. 2 provides the gasification gas yield compositions related to samples of FIG. 1. A significant increase in $H_2$ production is observed for the dual catalyst samples where the nanoalloy catalyst in DEG dispersed in ethanol. The resulting syngas is an excellent feed stream for a Fischer-Tropsch reactor.

For both FIGS. 1 and 2, it is noted that the data is limited to the tests conducted to date. For instance, other nanoalloy catalysts will be suitable for increased bio-oil or gas yields at relatively low gasification temperatures. The subject figures represent the test results to date.

The subject nanocatalyst, dual catalyst and methods disclosed herein produce increased syngas, including carbon monoxide, relative to gasification of a biomass that is not in accordance with the subject method, The increased syngas even occurs at gasification temperatures below the baseline test. Carbon monoxide and $H_2$ production from biomass occurs in each sample but, by contacting an organometallic compound(s) and nanoalloy catalyst with a biomass before or during gasification of the biomass, the syngas is well suited for further processing.

It is therefore believed that the use of the subject method provides significant and unexpected benefits for the gasification process of biomass. The subject method increases gas yields, and reduces solid and liquid yields. Oil yields may also be increased, in one embodiment, if desired. Tar production is reduced. The subject methods will produce a dramatic and highly desirable benefit for processes, devices and systems for the gasification of biomass.

Other embodiments of the present invention will be apparent to those skilled in the art from consideration of the specification. It is intended that the specification and Figures be considered as exemplary only, with a true scope and spirit of the invention being indicated by the following claims.

What is claimed is:
1. A composition comprising:
(1) a biomass;
(2) a nanoalloy catalyst comprising:
  (a) a support material (S) selected from the group consisting of silicon, silica, alumina, titania, nanocarbon, graphene, activated carbon, thoria, zirconia, zeolites, and mixtures thereof,
  (b) at least one metal-containing compound comprising a nanoalloy of at least two metals ($M_1$ and $M_2$) selected from the group consisting of Fe, Co, Ni, Mo, W, Th, Ru, Pt, Rh, Mn, Cr, Ga, La, Ce, Re, Pd, Ti, Cu, and K; and
  (c) wherein the nanoalloy catalyst comprises particles having a grain size of less than 50 nanometers; and

(3) a volatile organometallic compound selected from the group consisting of cyclomatic manganese carbonyl compounds, methyl cyclopentadienyl manganese tricarbonyl, cyclopentadienyl manganese tricarbonyl, manganese carbonyl materials, ferrocene, iron carbonyl materials, cerium containing compounds, platinum group metal compounds, and mixtures thereof.

2. The composition of claim 1, wherein the support material of the nanoalloy catalyst is about 50 wt % of the nanoalloy catalyst.

3. The composition of claim 1, the biomass selected from the group consisting of wild and/or anthropogenically cultivated, and/or genetically engineered, and/or bioengineered trees, bushes, grasses, algae, plankton, aquatic plants, animals, yard trimmings and waste, wood chips, saw dust, mariculture products, animal parts and carcasses, animal waste, farm waste, agricultural waste, fodder, silage, organic waste and/or by-products, and mixtures thereof, and emulsions, suspensions, and dispersions thereof in water, alcohol, or other carrier fluids.

4. The composition of claim 1, wherein the nanoalloy catalyst comprises polar solvent dispersible or polar solvent soluble nanoalloy catalyst.

5. A composition comprising:
    (1) a nanoalloy catalyst comprising
        (a) a support material (S) selected from the group consisting of silicon, silica, alumina, titaMa, nanocarbon, graphene, activated carbon, thoria, zirconia, zeolites, and mixtures thereof;
        (b) at least one metal-containing compound comprising a nanoalloy of at least two metals ($M_1$ and $M_2$) selected from the group consisting of Fe, Co, Ni, Mo, W. Th, Ru, Pt, Rh, Mn, Cr, Ga, La, Ce, Re, Pd, Ti, Cu, and K; and
        (c) wherein the nanoalloy catalyst comprises particles having a grain size of less than 50 nanometers; and
    (2) a volatile organometallic compound selected from the group consisting of cyclomatic manganese carbonyl compounds, methyl cyclopentadienyl manganese tricarbonyl, cyclopentadienyl manganese tricarbonyl, manganese carbonyl materials, ferrocene, iron carbonyl materials, cerium containing compounds, platinum group metal compounds, and mixtures thereof.

6. The composition of claim 5, wherein the metal containing compound $M_1$ is Ni and the metal-containing compound $M_2$ is Cu.

7. The composition of claim 6, wherein the nanoalloy catalyst is $Ni_3Cu(SiO_2)_6$.

8. The composition of claim 6, wherein the nanoalloy catalyst is $Si_{50}Ni_{35}Cu_{10}Ce_5$.

9. The composition of claim 5, wherein:
    the at least one metal-containing compound comprises 25 to 80 wt % of the nanoalloy catalyst,
    at least one promoter comprises 15 to 25 wt % of the nanoalloy catalyst, and
    at least one activator comprises 0.001 to 1 wt % of the nanoalloy catalyst.

10. The composition of claim 1, wherein the biomass comprises:
    lignin in a concentration of about 15 to 25 wt %,
    hemicellulose in a concentration of about 23 to 32 wt %,
    cellulose in a concentration of about 38 to 50 wt %.

11. The composition of claim 1, wherein:
    the nanoalloy catalyst comprises 0.25 to 5 wt % as a wt percentage of the biomass, and
    the volatile organometallic compound comprises 0.25 to 8 wt % as a wt percentage of the biomass.

12. The composition of claim 11, wherein:
    the nanoalloy catalyst comprises 4 wt % as a wt percentage of the biomass, and
    the volatile organometallic compound comprises 1 wt % as a wt percentage of the biomass.

13. The composition of claim 1, wherein the nanoalloy catalyst comprises particles having grain sizes from about 1 to 30 nm.

14. The composition of claim 13, wherein the nanoalloy catalyst comprises particles having grain sizes from about 2 to 10 nm.

15. The composition of claim 1, wherein the amount of nanoalloy catalyst exceeds the amount of volatile organometallic compound.

16. The composition of claim 1, wherein the organometallic compound is selected from the group consisting of cyclomatic manganese carbonyl compounds, methyl cyclopentadienyl manganese tricarbonyl, cyclopentadienyl manganese tricarbonyl and manganese carbonyl materials.

17. The composition of claim 5, wherein the organometallic compound is selected from the group consisting of cyclomatic manganese carbonyl compounds, methyl cyclopentadienyl manganese tricarbonyl, cyclopentadienyl manganese tricarbonyl and manganese carbonyl materials.

* * * * *